June 17, 1924.
W. YOULTEN
1,497,706
MATERIAL SEPARATING MACHINE
Filed March 5, 1923
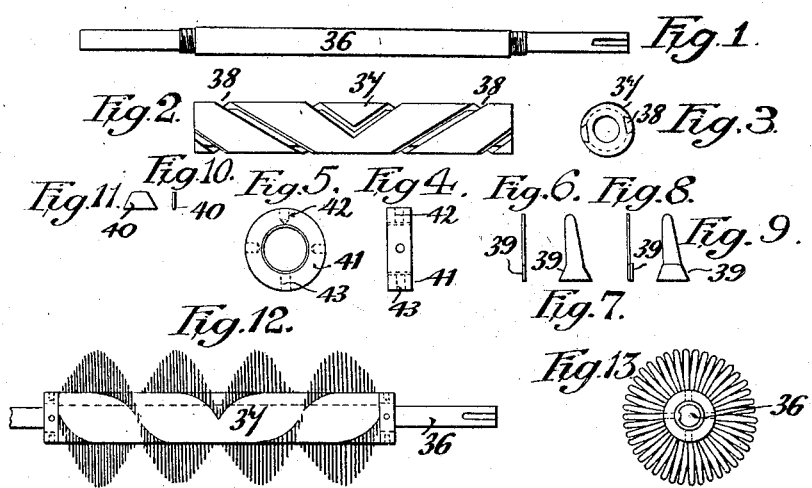
INVENTOR
William Youlten
BY Townsend & Decker
ATTORNEYS.

Patented June 17, 1924.

1,497,706

UNITED STATES PATENT OFFICE.

WILLIAM YOULTEN, OF HOVE, ENGLAND, ASSIGNOR TO "ONYX" TEXTILE MACHINERY (U. S. A.) LIMITED, OF LONDON, ENGLAND.

MATERIAL-SEPARATING MACHINE.

Application filed March 5, 1923. Serial No. 622,800.

*To all whom it may concern:*

Be it known that I, WILLIAM YOULTEN, a subject of the King of Great Britain and Ireland, residing at Hove, in the county of Sussex, England, have invented Improvements in or Relating to Material-Separating Machines, of which the following is a specification.

This invention relates to means more particularly applicable for the separation of dirt and the like from fibrous materials and it comprises improvements in a class of machine which is now well known and is described in my earlier specification No. 1,010,104.

Another object of the invention is to provide for the construction of the rotary bladed device, which operates within the revolving cage in a more convenient manner and so that blades of one helical set can be removed without interfering with blades of the helical set arranged upon the same length of the device.

But in order that the invention may be more readily understood one specific example will now be described, with the aid of the accompanying drawings in which Figs. 1 and 2 are elevations of two component parts of a rotor used in the machine.

Fig. 3 is an end view of Fig. 2.

Figs. 4 and 5 are respectively an elevation and end view of a device for maintaining the parts of Figs. 1 and 2 in position when assembled.

Figs. 6 and 7 are views similar to Figs. 4 and 5 of one form of blade for use in the rotor and Figs. 8 and 9 are similar views of another form of blade.

Figs. 10 and 11 are views similar to Figs. 4 and 5 of a spacer used with blades according to Figs. 6 and 7.

Fig. 12 is a front elevation of the rotor complete and

Fig. 13 is an end elevation thereof.

In the construction of the bladed rotor a support of two diameters may be employed derived either by fitting a sleeve over a shaft or by reducing the ends of a larger shaft. The former arrangement is shown 36 denoting a shaft and 37 the companion sleeve. Starting from two diametrical points at one end of the sleeve 37, or larger portion of a two diameter shaft, two helical grooves 38 are formed, dovetailed or undercut in cross section, as shown in Fig. 3, and extending to the centre of the length of the sleeve where they become united to a pair of similar grooves of opposite hand formed in the remaining half of the sleeve. Conveniently each groove makes one complete turn in half the length of the sleeve.

The blades may consist of stampings, as shown in Figs. 6 and 7 having roots 39 shaped to fit the helical grooves 38 and machined all over, the requisite spacing being obtained by means of separate distance pieces 40 as shown in Figs. 10 and 11 or by increasing the thickness of the roots 39 to the desired extent as shown in Figs. 8 and 9. In either case the parts are so shaped that they accurately fit the grooves and ensure a perfectly smooth surface being provided not only between the blades but between the rows of blades. The blades which may be inserted singly into any one groove irrespective of another are ultimately collectively held by circular nuts 41 Figs. 4 and 5 having tommy bar holes 42 and each locked in position by a grub screw at 43.

By machining the blades all over, a high degree of accuracy is ensured both as to shape and uniformity of weight which tends to produce more perfect balance in running.

What I claim is:—

1. In a machine of the kind referred to, a bladed rotor comprising a support of two diameters, the larger portion whereof has two helical grooves undercut in cross section starting from two diametrical points at one end and extending to the centre of the length of such portion, and a pair of similar grooves of opposite hand formed in the remaining half of the portion aforesaid, blades having roots adapted to be inserted in said grooves, and means whereby the blades can be inserted into each groove separately from both ends thereof and similarly removed, substantially as described.

2. In a machine of the kind referred to, a rotor comprising stampings having dovetail roots greater in thickness than the remainder thereof the thickened portion of one root making direct contact with an adjacent root so as to act as distancing means, substantially as described.

3. In combination, a shaft screw threaded near each end, a sleeve adapted to occupy a position upon the shaft between the screw threaded portions of the latter and having a pair of helical undercut grooves proceeding from each end to the centre where they are united, one such pair of grooves being of opposite hand to the other, blades having roots adapted to be inserted in said grooves, and nuts engaging the screw threaded portion of the shaft whereby the blades can be inserted into each groove separately, from both ends thereof and similarly removed, substantially as described.

Signed at Manchester in England this the seventh day of February 1923.

WILLIAM YOULTEN.